(12) United States Patent
Strömberg et al.

(10) Patent No.: US 12,007,947 B2
(45) Date of Patent: Jun. 11, 2024

(54) CONTENT ACCESS

(71) Applicant: Microsoft Technology Licensing, LLC, Redmond, WA (US)

(72) Inventors: Johannes Fredrik Strömberg, Malmö (SE); Henrik Jersling, Södra Sandby (SE); Tor Andrae, Skåne (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/844,697

(22) Filed: Jun. 20, 2022

(65) Prior Publication Data
US 2022/0318196 A1 Oct. 6, 2022

Related U.S. Application Data

(63) Continuation of application No. 15/637,881, filed on Jun. 29, 2017, now Pat. No. 11,366,789.

(51) Int. Cl.
| | |
|---|---|
| *G06F 21/10* | (2013.01) |
| *G06F 16/16* | (2019.01) |
| *G06F 16/43* | (2019.01) |
| *G06F 21/62* | (2013.01) |
| *H04L 9/40* | (2022.01) |
| *H04N 21/258* | (2011.01) |
| *H04W 12/082* | (2021.01) |

(52) U.S. Cl.
CPC ............ *G06F 16/168* (2019.01); *G06F 16/43* (2019.01); *G06F 21/10* (2013.01); *G06F 21/6218* (2013.01); *H04L 63/0428* (2013.01); *H04L 63/08* (2013.01); *H04L 63/10* (2013.01); *H04N 21/25875* (2013.01); *H04W 12/082* (2021.01)

(58) Field of Classification Search
CPC ........ G06F 16/168; G06F 16/43; G06F 21/10; G06F 21/6218; H04L 63/0428; H04L 63/08; H04L 63/10; H04N 21/25875; H04W 12/082
See application file for complete search history.

(56) References Cited

U.S. PATENT DOCUMENTS

| | | | |
|---|---|---|---|
| 2002/0099944 A1* | 7/2002 | Bowlin | G06F 21/6218 713/185 |
| 2006/0047727 A1* | 3/2006 | Karp | G06F 21/6218 |
| 2010/0242097 A1* | 9/2010 | Hotes | H04W 12/082 709/219 |
| 2012/0311702 A1* | 12/2012 | Krstic | G06F 21/53 726/22 |
| 2017/0118186 A1* | 4/2017 | Kaipu | H04L 63/0823 |

* cited by examiner

*Primary Examiner* — Amie C. Lin
(74) *Attorney, Agent, or Firm* — Barta Jones, PLLC

(57) ABSTRACT

A computing device is described which has at least one application access record storing references to content items stored at the computing device. At least one local store stores other content items. A processor of the computing device executes at least one application, the application having ability to access the content items referenced in the application access record and restricted from accessing the other content items. An operating system of the computing device is configured to search the local store to identify at least one of the other content items on the basis of criteria, and to suggest the identified other content item(s) to a user of the computing device for access by the application.

20 Claims, 6 Drawing Sheets

CONTENT ACCESS

CROSS-REFERENCE TO RELATED APPLICATION

This application is a continuation application of and claims priority to U.S. patent application Ser. No. 15/637,881, entitled "CONTENT ACCESS," filed on Jun. 29, 2017, the disclosure of which is incorporated herein by reference in its entirety.

BACKGROUND

Content items such as digital videos, digital photographs, audio files, documents, emails, blog posts or other content items often comprise confidential or private information which it is desired to secure. Software applications which are untrusted could potentially gain access to confidential or private content items on a computing device, where the software application is downloaded and executed on the computing device. Thus many existing computing devices use a sandbox approach where software applications executed at the computing device are restricted as to which content items they are able to access. This type of restriction leads to problems in many cases, where users are unable to access content items which are at the computing device but which are outside the sandbox.

The embodiments described below are not limited to implementations which solve any or all of the disadvantages of known content access systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device is described which has at least one application access record storing references to content items stored at the computing device. At least one local store stores other content items. A processor of the computing device executes at least one application, the application having ability to access the content items referenced in the application access record and restricted from accessing the other content items. An operating system of the computing device is configured to search the local store to identify at least one of the other content items on the basis of criteria, and to suggest the identified other content item(s) to a user of the computing device for access by the application.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
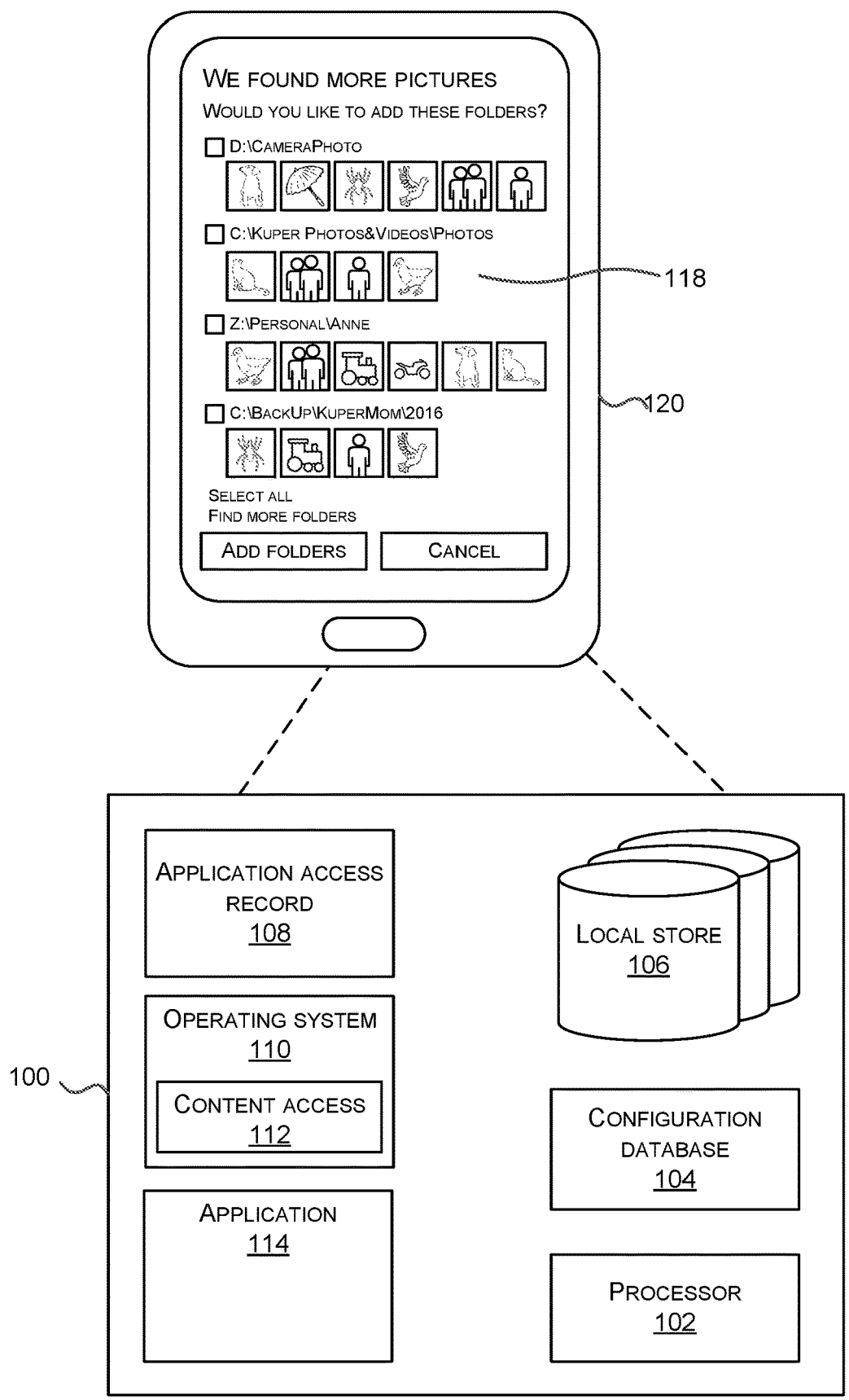
FIG. 1 is a schematic diagram of a smart phone with a content access system.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, many existing computing devices use a sandbox approach where software applications executed at the computing device are restricted as to which content items they are able to access. The term "sandbox" means specified locations on a computing device which are the only locations on that computing device that an application associated with the sandbox is able to access content items from. This restriction protects the user's other data, which is outside the sandbox, from the application itself (which may be untrusted) and from other untrusted entities trying to gain or infer the user's other data via the application. However, sandbox restriction leads to problems in many cases, where users would like an application to access content items which are at the computing device but which are outside the application's sandbox. Manually configuring settings to change the content items or locations which are within the sandbox is time consuming and complex. Many users do not know how to do this. If a user knows that it is possible to manually change the sandbox, he or she often finds it difficult to identify what content items to add to the sandbox. There is a possibility for error where manual adjustment of the sandbox is made and this leads to loss of protection of the user's confidential data in some cases.

Various examples described herein use an operating system which is configured to work behind the scenes, that is, generally without troubling the end user, to identify content items potentially to be added to the sandbox. By doing this work in the background the operating system is ready to provide suggestions to a user of content items to be added to the sandbox. In some examples, user authorization is requested and once received, suggested content items are added to the sandbox. The application associated with the sandbox is then able to access the content items. Burden on the user is reduced since the user does not need to manually configure the sandbox. Also, the user does not need to manually identify content items to be added to the sandbox. The user's data is protected since the application only accesses content items in the sandbox and user authorization is obtained before modifying the sandbox. Since the operating system is modified there is a technical effect at the level of the architecture of the computer and the end result is a computer which works more efficiently and effectively.

User authorization is requested by the operating system itself, rather than by the application, in various examples described herein. This improves security and reduces the risk of an untrusted application maliciously modifying or faking user authorization. However, it is not straightforward to enable the operating system to obtain the user authorization in a manner which coordinates with the application. In many cases, the sandboxed application is executing at a computing device and being used by the end user whilst the operating system is ready to seek user authorization.

FIG. 1 is a schematic diagram of a computing device 100, which is a smart phone 120, and where the computing device 100 comprises an operating system 110 with a content access system 112 and a processor 102. The computing device 100 is any computing device including but not limited to: a desktop computer, an augmented reality computing device, a wearable computer, a smart watch, a tablet computer, a laptop computer, a game console. The computing device 100 has one or more applications 114 installed at the computing device 100 such as an application for viewing content items, an application for authoring content items, or an application for viewing and annotating or editing content items.

A plurality of content items are stored at the computing device at one or more local stores 106. The content items are any of: images, videos, audio recordings, voice mail messages, email messages, documents, blog posts, or other content items. The local stores are at the computing device 100 and in some cases are storage drives of the computing device 100.

The application 114 is sandboxed in that it is only able to access a content item stored on the computing device 100 if there is a reference to the content item in an application access record 108 stored at the computing device 100. The application has the ability to access the content item stored on the computing device if there is a reference to the content item in the application access record stored at the computing device 100; otherwise the application is restricted from accessing the content item. The reference to the content item is a path name of the content item, or a path name of a folder containing the content item. A path name is an identifier of a path in a hierarchical representation of storage locations in one or more of the local stores 106. In some cases the hierarchical representation is a file system or a folder tree. There is more than one application access record in some examples. The sandboxed application 114 has stored data, such as a manifest, which lists one or more of the application access records. The application is only able to access content items which are referenced in those application access records. This is because it does not know the path names of other content items in the local stores 106 which are not included in the application access records it knows about. In this way, the application 114, which may be untrusted, is prevented from accessing confidential content items stored in local stores 106 and which are not referenced in the application access record 106.

The computing device 100 comprises an operating system 110 that comprises the content access component 112; that is, the technology described herein uses a specially configured operating system. The operating system is configured to search the local stores 106 for content items, or folders of content items, which a user is predicted to want to add to the application access record 108. The operating system computes these predictions behind the scenes and is able to store the predictions in a store that it is able to access such as configuration database 104. Configuration database 104 is a database holding details about hardware of the computing device 100 and software applications 114 installed at the computing device 100.

The example in FIG. 1 shows a scenario in which the application 114 is a photos application being used by a user of the smart phone 120 to view photographs that are stored on the smart phone which has an integral camera used to capture the photographs. The photos application is sandboxed so that it is able to retrieve photographs from folders mentioned in the application access record 108 but not from elsewhere on the smart phone 120. The content access system 112 of the operating system has done a search behind the scenes and has found folders containing photos stored on the smart phone 120 and which are not listed in the application access record 108. The content access system, under certain conditions explained in more detail below, offers suggestions to the user as illustrated in FIG. 1. The suggestions are for content items to be added to the application access record. In the scenario of FIG. 1 which is not intended to limit the scope of the technology, four folders of photos are suggested by the operating system and for each folder a path name and a plurality of thumbnail images of the photos in the folder is given. A user is able to select one or more of the suggested folders and then select an "add folders" element to trigger addition of the folders to the application access record 108. Once the folders have been added the application 114 is able to access the photos which are in the added folders. Once the folders have been added there is a change to the sandbox which persists until a user takes action to change the sandbox again. Thus, when the application is launched at another day or later time, the application is still able to access the photos in the folders which were added to the application access record. Because the user authorized addition of the folders to the application access record the user has control over which content items are protected (by being outside the sandbox) and which are inside the sandbox.

In the example of FIG. 1 a graphical user interface pop up or window is generated and displayed by the operating system, over a display associated with the photos application and thus the photos application user interface is obscured. In other examples the graphical user interface pop up or window generated by the operating system is displayed adjacent to the user interface of the application.

Figure 2:
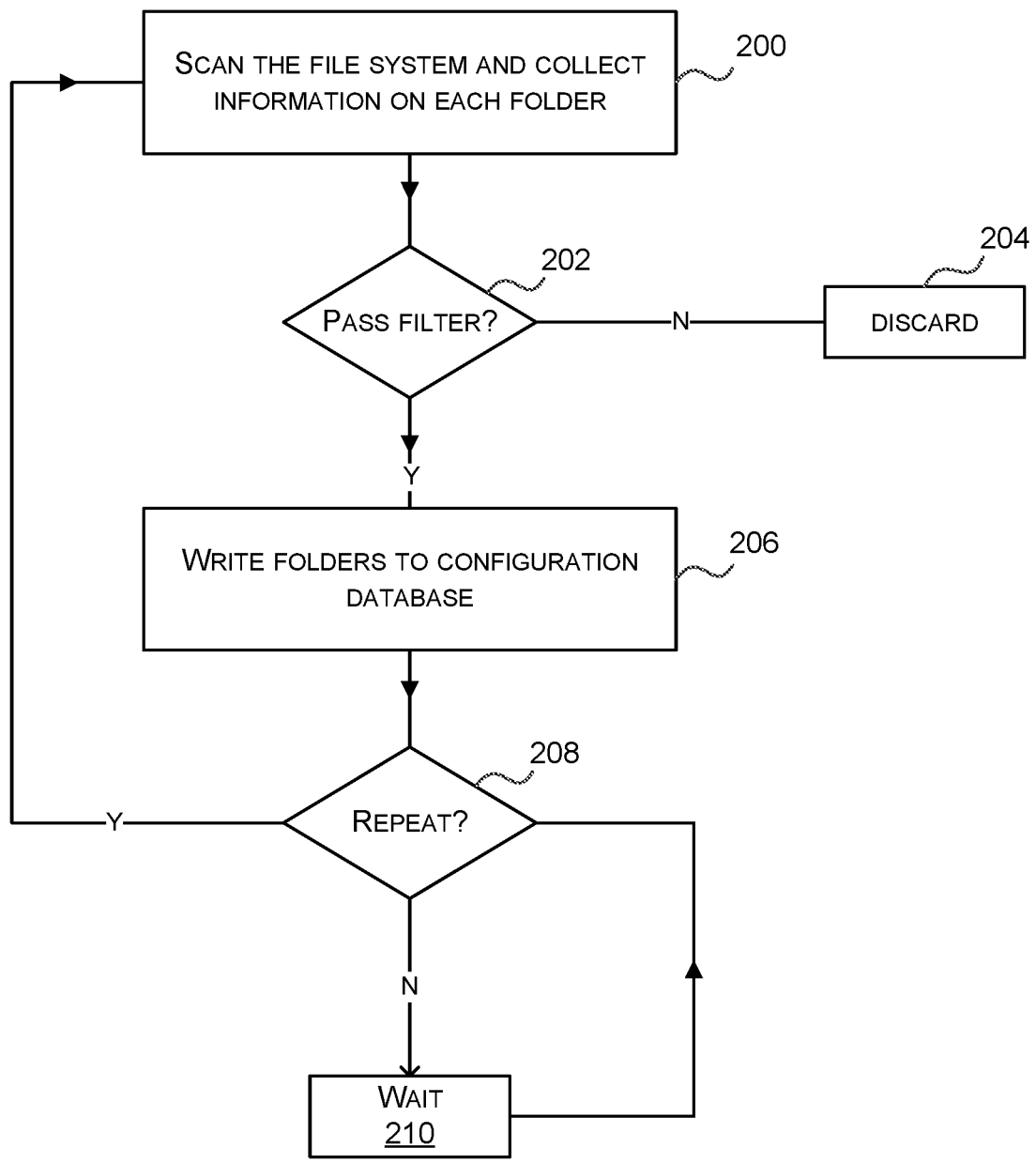
FIG. 2 is a flow diagram of a method of operation at an operating system of a computing device such as that of FIG. 1.

FIG. 2 is a flow diagram of a method of operation at an operating system of a computing device such as that of FIG. 1. The content access system 112 searches at least one of the local stores 106 to find content items that are predicted to be ones a user wants to add to the application access record. In some cases the search is done by scanning a file system, or searching a folder tree of the local store 106 to collect information on each folder and then checking if one or more rules are met in a selection step 202 also referred to as filtering.

The process of collecting information on each folder comprises computing an accumulated number of content items of interest for each folder of the folder tree, where the accumulated number of content items of interest is computed as the number of content items which meet criteria and which are in the folder itself plus the number of content items which meet the criteria in subfolders of the folder. The criteria comprise content item size and/or content item type. The type of a content item is determined by inspecting a file extension of a file name of the content item such as .jpg, .docx, .pdf and others. The size of the content item is determined by inspecting a file header of the content item or in other ways.

Once the information on each folder has been collected, there is a selection process as indicated by decision box 202 of FIG. 2. During the selection process 202, the operating system searches the folder tree by traversing the folder tree from a root of the folder tree and inspecting the accumulated number of content items, and if a folder passes at least one rule, writing an identifier of the folder to a configuration database 206 or any other store accessible to the operating system. The rule is related to the accumulated number of content items. If a folder does not pass the rule, because the accumulated number of content items is less than a threshold for example, the reference to the folder is discarded 204 and not written to the configuration database 206 or other store. An example of a rule is a check whether the number of accumulated content items is above a threshold value. Another example of a rule is a check whether the number of accumulated content items, as a proportion of a total number of content items in the folder and its subfolders, is greater than a threshold value. Another example of a rule is a combination of the previous two rules.

The operating system is configured to repeat 208 the search of the local store at scheduled intervals as indicated in FIG. 2 by decision box 208 and wait operation 210.

Figure 3:
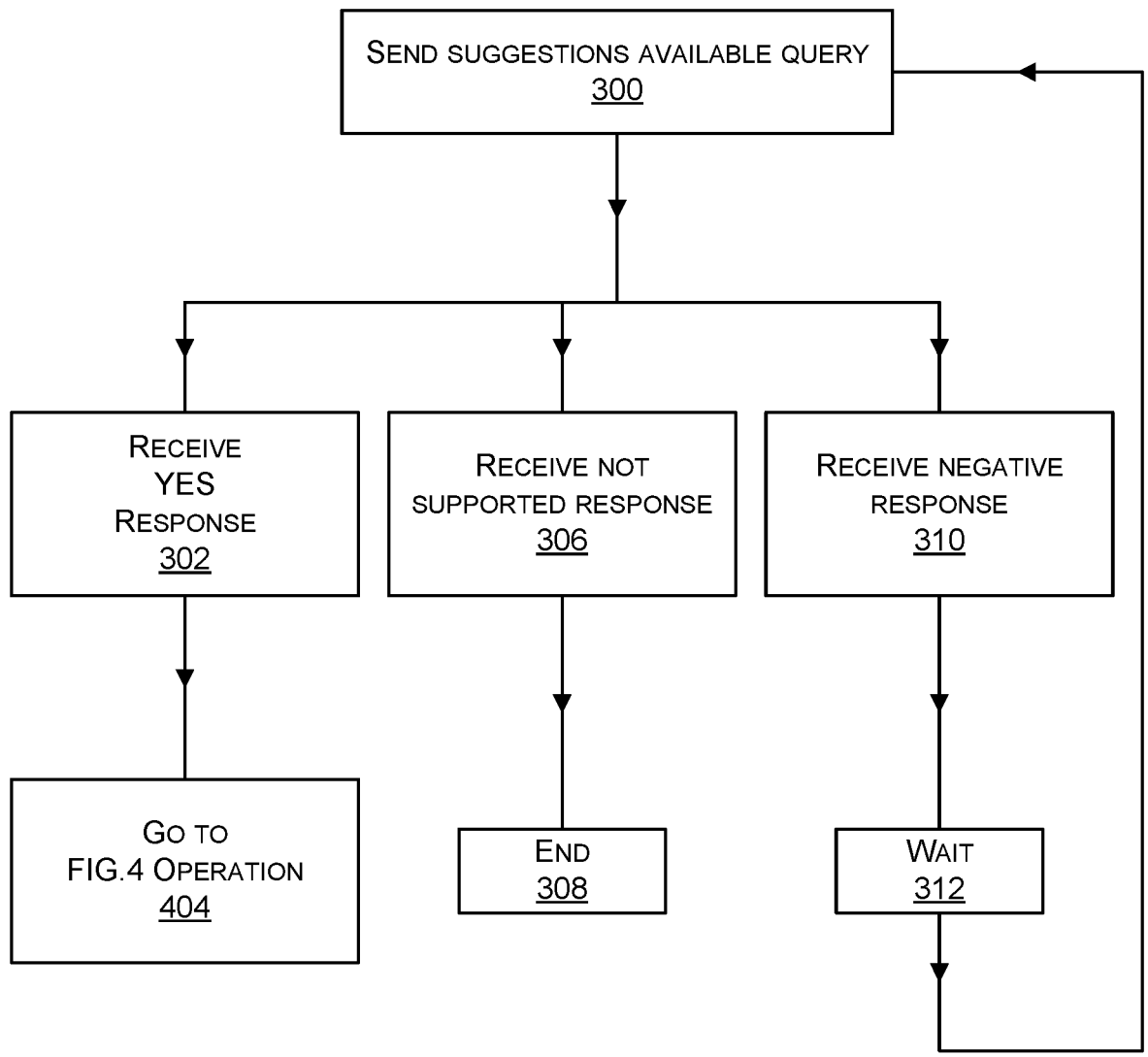
FIG. 3 is a flow diagram of a method of operation at an application executing on a computing device such as that of FIG. 1.

The application 114 is arranged to send queries to the operating system to check whether suggestions of content items, references to content items, or folders are available. FIG. 3 is a flow diagram of process at the application 114 where the application sends a query 300 to the operating system to ask whether suggestions are available. If the application receives a positive response 302 from the operating system, the application moves to operation 404 of FIG. 4. If the application receives a response indicating that the operating system does not support suggestions 306 then the process ends 308 and the application continues to operate as normal. If the application receives a negative response 310 from the application it waits 312 and then sends another query 300 to the operating system.

Figure 4:
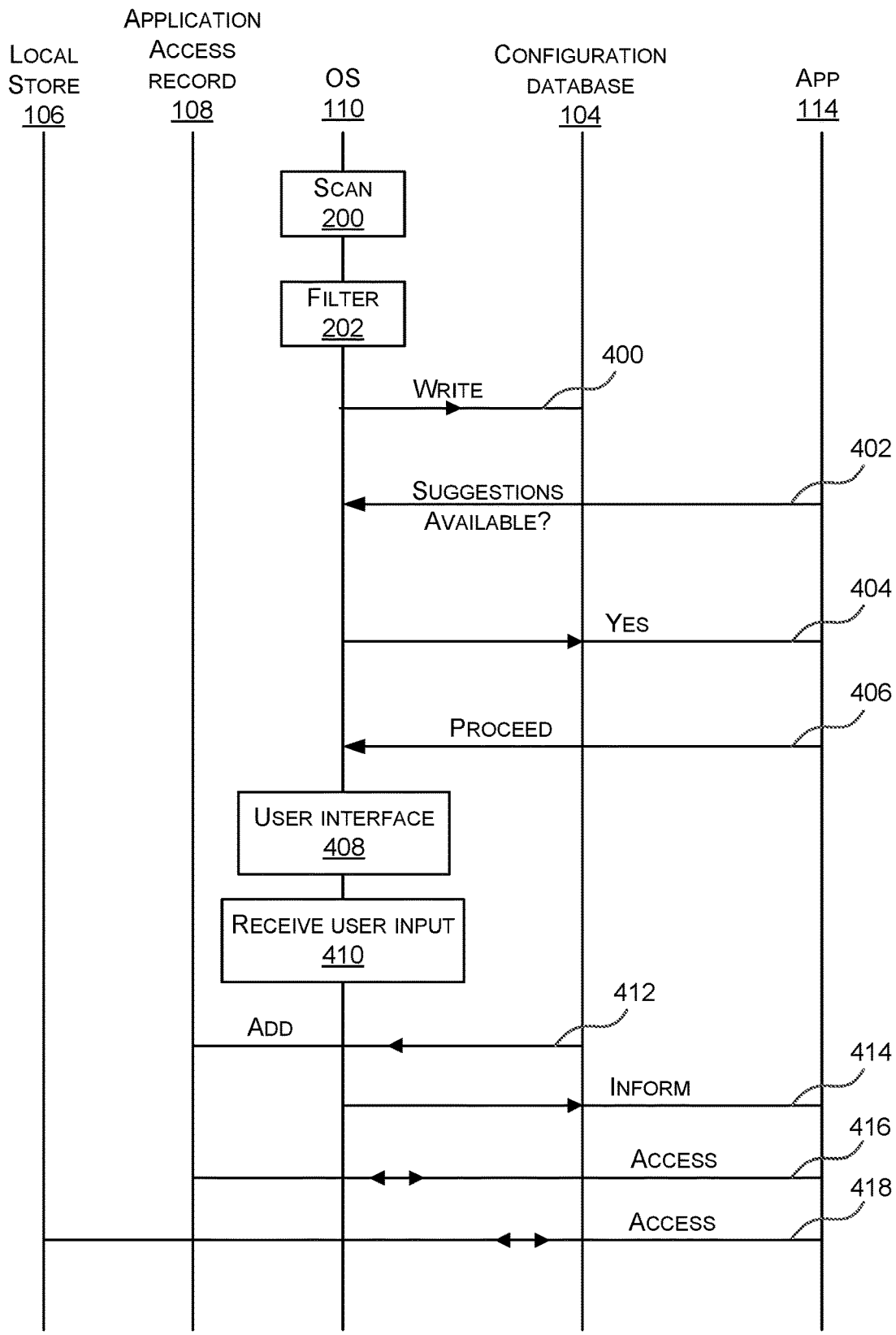
FIG. 4 is a message sequence chart of a process of content access.

FIG. 4 is a message sequence chart where vertical lines represent individual components or entities and arrows between the vertical lines represent messages sent between the components or entities. The relative vertical position of the arrows on the page indicates the chronological order of the messages.

FIG. 4 represents one of the local stores 106 of the computing device 100 by a vertical line and application access record 108 by another vertical line. The operating system 110 is represented by a vertical line, as is the configuration database 104 and the application 114.

With reference to FIG. 4 the operating system 110 carries out the scanning operation 200 and the filtering operation 202 as described above with reference to FIG. 2. Any suggestions of folders and/or content items are written during write operation 400 to the configuration database 104 or other store accessible to operating system 110.

The application 114 polls the operating system at intervals by sending a suggestions available query 402 to the operating system. If the operating system knows that suggestions are available and have been written to the configuration database 104, it sends a "yes" message 404 back to the application. The application 114 is then able to choose a good moment at which to trigger the operating system to proceed with requesting user authorization. When the application 114 is ready to be interrupted by the operating system making a request for user input, it sends a proceed message 406 to the operating system.

The operating system 110 is configured, in response to the request 406 from the application 114, to suggest the identified other content item to a user of the computing device, during execution of the application 114 at the computing device.

The operating system is configured to suggest the identified other content item by generating a graphical user interface element 408 and rendering the graphical user interface element over a display associated with the application 114 such as illustrated in FIG. 1. User input is received 410 by the operating system 110 such as to authorize addition of the folders or content items to the application access record 108 or to deny that addition. If authorization is given, the operating system proceeds to add 412 the suggested folder(s) and/or content item(s) from the configuration database 104 to the application access record 108 as indicated by arrow 412.

Thus the operating system is configured to add the identified other content item(s) or references to the identified other content item(s) to the application access record 108, only when user input has been received 410 authorizing the addition. If the user input denies the addition then the suggested folders and/or content items are not added to the application access record 108.

The operating system 110 is configured to inform 414 the application 114 when it has made the addition to the application access record 108. The application 114 is then able to access 416 the application access record 108 and gain the path names of the folders and/or content items in the application access record 108. The application 114 is able to use the path names to access 418 the folders and or content items in the local store 106 and make those available to the user through the application 114 such as to view the content items, edit the content items or for other purposes.

Figure 5:
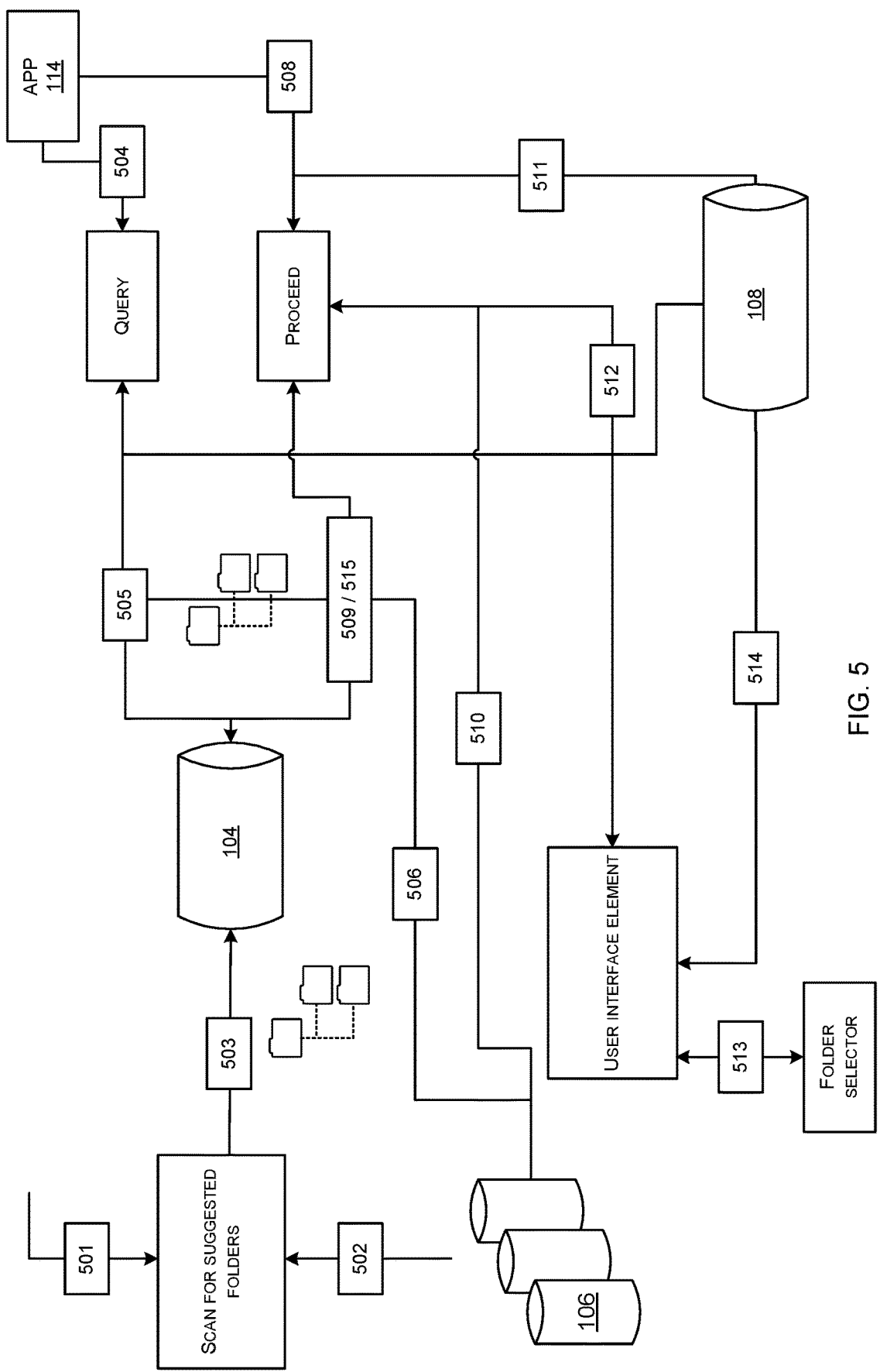
FIG. 5 is a schematic diagram of a content access system and content access process.

FIG. 5 is a schematic diagram of a content access system and content access process. It shows a plurality of local stores 106 of a computing device, a configuration database 104 of the computing device and an application access record 108 of the computing device.

At operation 501 a scheduler of the operating system of the computing device triggers the operating system to scan the local stores 106 for suggested folders or other content items using the scanning process described above with reference to FIG. 2. Any suggested folders or other content items which are identified using the process of FIG. 2 are written at operation 503 to configuration database 104.

The application 114 sends a query at operation 504 to the operating system to find out whether suggestions are available for folders and/or content items. The query may be a call of a function of an application programming interface made available by the operating system. The query triggers the operating system to check at operation 505 whether configuration database 104 has available suggestions. The operating system also checks at operation 506 whether these suggestions are still available at the local stores (in case these have been deleted or moved in the meantime). The operating system informs the application 114 that suggestions are available when this is the case. The application then, in operation 508, triggers the operating system to proceed with requesting user input by calling a function of the application programming interface of the operating system.

The operating system gets (operation 509) the folder or content item suggestions from the configuration database 104. It verifies that the suggested folders still exist (see operation 510). It verifies that the suggested folders are not already in the application access record 108 (see operation 511). It displays a dialog (see operation 512) such as the dialog of FIG. 1 on the smart phone display of FIG. 1. If the user selects the "find more folders" option in the dialog the operating system displays a folder selector at operation 513 to enable a user to browse folders and content items available on the computing device and select one or more of those folders or content items. The operating system then adds (see operation 514) the selected content items and/or folders to the application access record 108.

Figure 6:
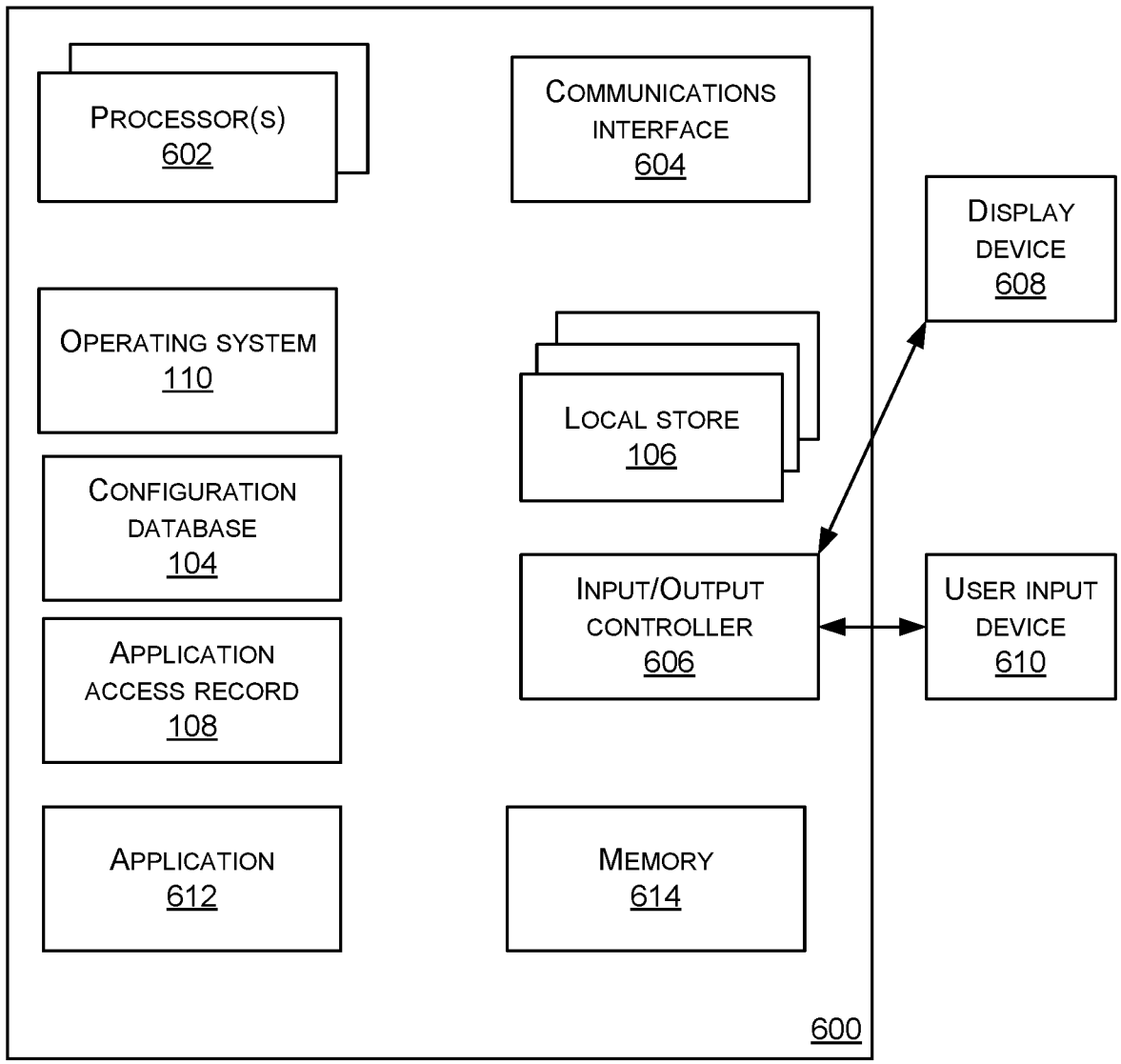
FIG. 6 illustrates an exemplary computing-based device in which embodiments of a content access system are implemented.

FIG. 6 illustrates various components of an exemplary computing-based device 600 which are implemented as any form of a computing and/or electronic device, and in which embodiments of a content access system are implemented in some examples.

Computing-based device 600 comprises one or more processors 602 which are microprocessors, controllers or any other suitable type of processors for processing computer executable instructions to control the operation of the device in order to compute predictions of content items and/or folders of content items which a user is likely to want to add to a sandbox of an application. In some examples, for example where a system on a chip architecture is used, the processors 602 include one or more fixed function blocks (also referred to as accelerators) which implement a part of the method of any of FIGS. 2 to 5 in hardware (rather than software or firmware). Platform software comprising an operating system 110 or any other suitable platform software is provided at the computing-based device to enable application software 612 to be executed on the device. The computing-based device comprises a configuration database 104 and an application access record 108.

The computer executable instructions are provided using any computer-readable media that is accessible by computing based device 600. Computer-readable media includes, for example, computer storage media such as memory 614 and communications media. Computer storage media, such as memory 614, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 614) is shown within the computing-based device 600 it will be appreciated that the storage is, in some examples, distributed or located remotely and accessed via a network or other communication link (e.g. using communication interface 604).

The computing-based device 600 also comprises an input/output controller 606 arranged to output display information to a display device 608 which may be separate from or integral to the computing-based device 600. The display information may provide a graphical user interface. The input/output controller 606 is also arranged to receive and process input from one or more devices, such as a user input device 601 (e.g. a mouse, keyboard, camera, microphone or other sensor). In some examples the user input device 601 detects voice input, user gestures or other user actions and provides a natural user interface (NUI). This user input may be used to select folders and/or content items for adding to the application access record 108. In an embodiment the display device 608 also acts as the user input device 610 if it is a touch sensitive display device. The input/output controller 606 outputs data to devices other than the display device in some examples, e.g. a locally connected printing device (not shown in FIG. 6).

Any of the input/output controller 606, display device 608 and the user input device 610 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computing device comprising:
  at least one application access record storing references to content items stored at the computing device;
  at least one local store storing other content items;
  a processor executing at least one application, the application having ability to access the content items referenced in the application access record and restricted from accessing the other content items;
  an operating system configured to search the local store to identify at least one of the other content items on the basis of criteria, and to suggest the identified other content item to a user of the computing device for access by the application.

The computing device described above wherein the criteria include one or more of: a content item size, a specified content item type, a number of content items.

The computing device described above wherein the operating system is configured to search a folder tree of the local store to identify at least one folder comprising the other content item(s).

The computing device described above wherein the operating system is configured to compute an accumulated number of content items of interest for each folder of the folder tree, where the accumulated number of content items of interest is computed as the number of content items which meet the criteria and which are in the folder itself plus the number of content items which meet the criteria in subfolders of the folder.

The computing device described above wherein the operating system is configured to search the folder tree by traversing the folder tree from a root of the folder tree and inspecting the accumulated number of content items, and if a folder passes at least one rule, storing an identifier of the folder as a folder which may be suggested to the user for access by the application.

The computing device described above wherein the operating system is configured to store the identifier of the folder in a configuration database of the computing device.

The computing device described above wherein the operating system is configured to store a reference to the identified content item(s) and to repeat the search of the local store at scheduled intervals.

The computing device described above wherein the operating system is configured, in response to a request from the application, to suggest the identified other content item to a user of the computing device, during execution of the application at the computing device.

The computing device described above wherein the operating system is configured to suggest the identified other content item by generating a graphical user interface element and rendering the graphical user interface element over a display associated with the application.

The computing device described above wherein the operating system is configured to add the identified other content item(s) or references to the identified other content item(s) to the application access record, only when user input has been received authorizing the addition.

The computing device described above wherein the operating system is configured to inform the application when it has made the addition to the application access record.

The computing device described above wherein the operating system is configured to receive a query from the application asking whether suggestions are available, and, in response to the query, to return a response in dependence on an outcome of the search.

The computing device described above wherein the operating system is configured to receive, in reply to the response, a request to proceed with requesting user authorization.

A method comprising:
  at an application access record, storing references to content items stored at a computing device;
  storing other content items at least one local store of the computing device;
  at a processor of the computing device, executing at least one application, the application having ability to access the content items referenced in the application access record and restricted from accessing the other content items; and
  at an operating system of the computing device, searching the local store to identify at least one of the other content items on the basis of criteria.

The method described above comprising storing the identified other content item(s) at a configuration database of the computing device.

The method described above comprising suggesting the identified other content item(s) to a user of the computing device for access by the application, when triggered by the application.

The method described above comprising adding the identified other item(s) to the application access record only when authorization from a user of the computing device has been received.

The method described above wherein searching the local store comprises search a folder tree of the local store to identify at least one folder comprising the other content item(s).

The method described above comprising computing an accumulated number of content items of interest for each folder of the folder tree, where the accumulated number of content items of interest is computed as the number of content items which meet the criteria and which are in the folder itself plus the number of content items which meet the criteria in subfolders of the folder.

One or more device-readable media with device-executable instructions that, when executed by a computing system, direct the computing system to perform operations comprising:
  at an application access record, storing references to content items stored at a computing device and within a sandbox of an application installed at the computing device;
  storing other content items at a local store of the computing device;
  at a processor of the computing device, executing the application; and
  at an operating system of the computing device, searching the local store to identify at least one of the other content items on the basis of criteria.

A computing device comprising:
  means for storing references to content items stored at the computing device;
  means for storing other content items at the computing device;
  means for executing at least one application, the application having ability to access the referenced content items and restricted from accessing the other content items; and means for searching the local store to identify at least one of the other content items on the basis of criteria.

For example, the means for storing references is the application access record described herein, and the means for storing other content items is a local store of the computing device. For example the means for executing the application is a processor of the computing device and the means for searching the local store is an operating system of the computing device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

We claim:

1. A computing device comprising:
   at least one application access record storing references to content items stored at the computing device;
   at least one local store storing other content items;
   a hardware processor executing an application, the application having ability to access the content items referenced in the application access record and restricted from accessing the other content items;
   an operating system configured to search the local store to identify at least one of the other content items on a basis of criteria;
   the hardware processor configured to perform operations comprising:
   prior to requesting access from the operating system to the at least one of the other content items:
      send, to the operating system, a request to check to confirm the at least one of the other content items are available;
      receive, from the operating system, confirmation that the at least one of the other content items are available; and
      send, to the operating system, a time for the operating system to request user authorization to add the available at least one of the other content items to the application access record for the application, such that the application is able to access the available at least one of the other content items;
   upon receiving confirmation of the user authorization, access the available at least one of the other content items; and
   providing the available at least one of the other content items to a user.

2. The computing device of claim 1, wherein the hardware processor is further configured to, based at least on receiving confirmation of the user authorization, accessing the at least one of the other content items from the application access record.

3. The computing device of claim 1, wherein the criteria include one or more of: a content item size, a specified content item type, a number of content items.

4. The computing device of claim 1, wherein the time for the operating system to request user authorization to access the at least one of the other content items is during execution of the application.

5. The computing device of claim 1, wherein the hardware processor is further programmed to: upon providing the at least one of the other content items to the user, receive, from the user, annotations or edits to the at least one of the other content times.

6. The computing device of claim 1, wherein the time for the operating system to request user authorization to access the at least one of the other content items is determined to be a best time for the application to be interrupted during execution of the application.

7. The computing device of claim 1, wherein the request for user authorization comprises providing a suggestion, to the user, for the at least one of the other content items.

8. A method comprising:
   search, by an operating system of a computing device, a local store of the computing device that stores other content items, to identify at least one of other content items on a basis of criteria, the at least one other content item being a content item that is not referenced by an access record of an application executing on the computing device, wherein the access record stores references to content items stored on the computing device, the application having an ability to access the content items referenced in the access record and is restricted from accessing the other content items;

prior to requesting access from the operating system to the at least one of the other content items:

sending, to the operating system, a request to check to confirm the at least one of the other content items are available;

receiving, from the operating system, confirmation that the at least one of the other content items are available; and sending, to the operating system, a time for the operating system to request user authorization to add the available at least one of the other content items to the access record for the application, such that the application is able to access the available at least one of the other content items;

upon receiving confirmation of the user authorization, accessing the available at least one of the other content items; and providing the available at least one of the other content items to a user.

9. The method of claim 8, further comprising, based at least on receiving confirmation of the user authorization, accessing the at least one of the other content items from the access record of the application.

10. The method of claim 8, wherein the criteria include one or more of: a content item size, a specified content item type, a number of content items.

11. The method of claim 8, wherein the time for the operating system to request user authorization to access the at least one of the other content items is during execution of the application.

12. The method of claim 8, further comprising, upon providing the at least one of the other content items to the user, receiving, from the user, annotations or edits to the at least one of the other content times.

13. The method of claim 8, wherein the time for the operating system to request user authorization to access the at least one of the other content items is determined to be a best time for the application to be interrupted during execution of the application.

14. The method of claim 8, wherein the request for user authorization comprises providing a suggestion, to the user, for the at least one of the other content items.

15. One or more computer-readable storage devices comprising computer-executable instructions that, when executed by a processor, direct the processor to perform operations comprising:

search, by an operating system of a computing device, a local store of the computing device that stores other content items, to identify at least one of other content items on a basis of criteria, the at least one other content item being a content item that is not referenced by an access record of an application executing on the computing device, wherein the access record stores references to content items stored at the computing device, the application having an ability to access the content items referenced in the access record and is restricted from accessing the other content items;

prior to requesting access from the operating system to the at least one of the other content items:

sending, to the operating system, a request to check the at least one of the other content items are available;

receiving, from the operating system, confirmation that the at least one of the other content items are available; and sending, to the operating system, a time for the operating system to request user authorization to add the available at least one of the other content items to the access record for the application, such that the application is able to access the available at least one of the other content items;

upon receiving confirmation of the user authorization, accessing the available at least one of the other content items; and providing the available at least one of the other content items to a user.

16. The one or more computer-readable storage devices of claim 15, wherein the operations further comprise: based at least on receiving confirmation of the user authorization, accessing the at least one of the other content items from the access record of the application.

17. The one or more computer-readable storage devices of claim 15, wherein the time for the operating system to request user authorization to access the at least one of the other content items is during execution of the application.

18. The one or more computer-readable storage devices of claim 15, wherein the operations further comprising: upon providing the at least one of the other content items to the user, receiving, from the user, annotations or edits to the at least one of the other content times.

19. The one or more computer-readable storage devices of claim 15, wherein the time for the operating system to request user authorization to access the at least one of the other content items is determined to be a best time for the application to be interrupted during execution of the application.

20. The one or more computer-readable storage devices of claim 15, wherein the request for user authorization comprises providing a suggestion, to the user, for the at least one of the other content items.

* * * * *